July 21, 1931.  R. D. SIMPSON  1,815,658
OSCILLATORY LIQUID DISTRIBUTOR
Filed Jan. 21, 1928   2 Sheets-Sheet 2
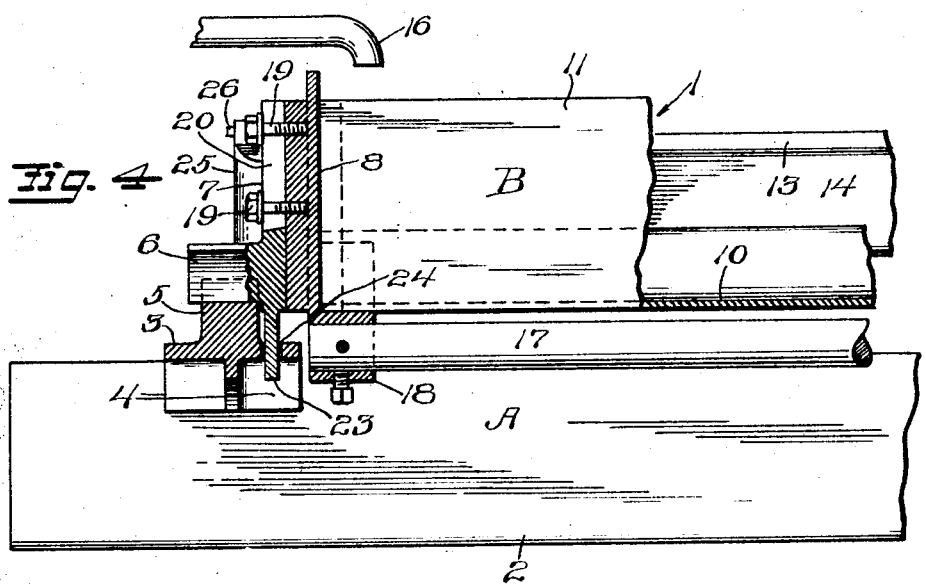
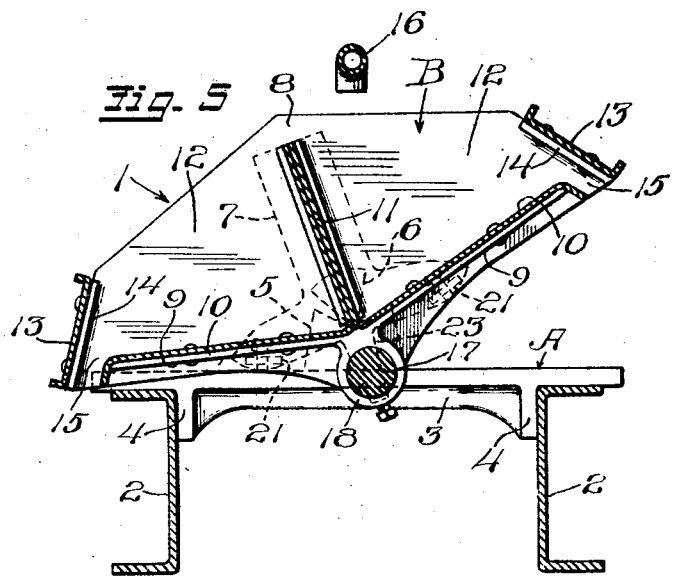
Inventor
Robert D. Simpson
By W. S. McDowell
Attorney Patented July 21, 1931

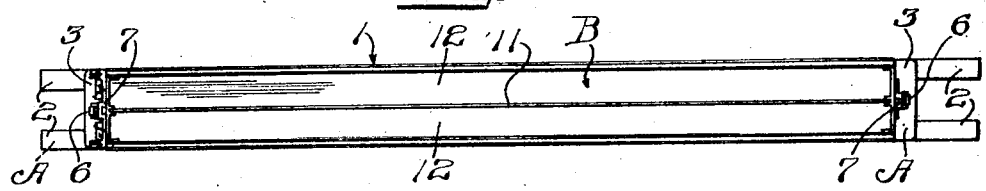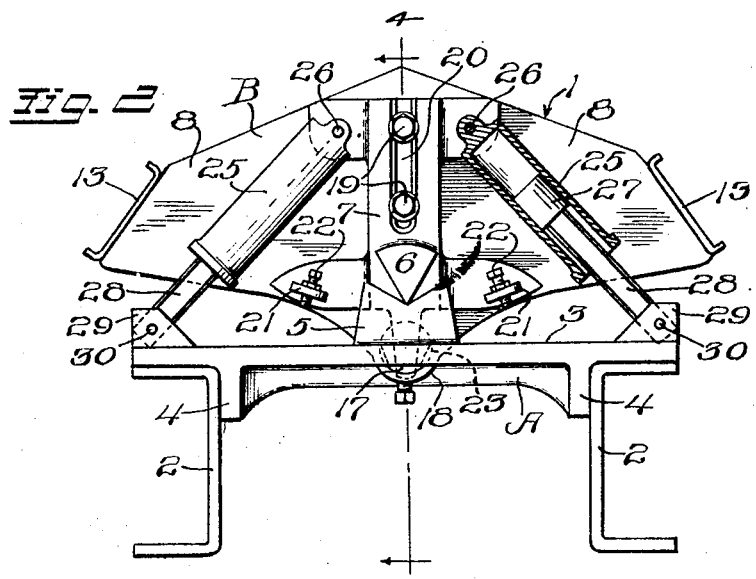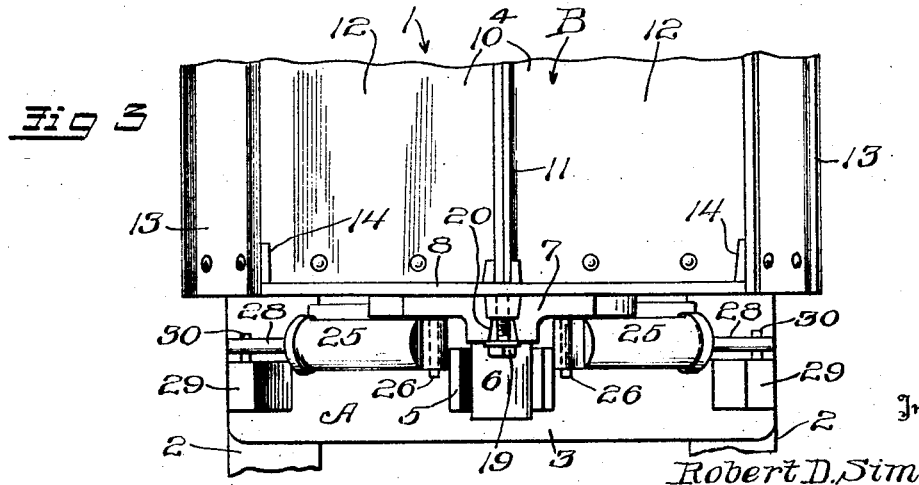

1,815,658

UNITED STATES PATENT OFFICE

ROBERT D. SIMPSON, OF COLUMBUS, OHIO

OSCILLATORY LIQUID DISTRIBUTOR

Application filed January 21, 1928. Serial No. 248,554.

This invention relates to an improved oscillatory liquid distributor and has for one of its primary objects the provision of an efficient, simple and durable distributor in the form of a trough which is divided longitudinally to produce liquid receiving compartments on the opposite longitudinal sides of the trough, the trough being mounted upon a supporting frame for tilting or oscillatory movement, and the arrangement of the compartment is such that after one compartment has been substantially filled with liquid the trough as a whole is revolved about its horizontal axis of support to discharge the liquid from the filled compartment and in order that the other compartments may be presented to the liquid supply means to permit of its filling with the liquid.

The tilting trough comprising the present invention may be used with considerable advantage in connection with filtering or liquid purifying systems. In said systems it is desirable to distribute the liquid uniformly and evenly and at a proper rate of flow over the filtering materials or beds and the trough comprising the present invention has been developed to meet these requirements. I am aware of the fact that such troughs or distributors have been used heretofore in connection with filtering systems, but it is one of the principal objects of the present invention to mechanically perfect such troughs or distributors so as to improve the operation thereof, their adjustment and control and to materially increase their life and general utility.

With these and other objects in view, as will appear as the description proceeds, the invention consists in the novel features of construction, combinations of elements and arrangements of parts thereinafter to be more fully described and pointed out in the appended claims.

In the accompanying drawings:

Figure 1 is a plan view of the liquid distributor comprising the present invention, Figure 2 is an end elevation thereof, Figure 3 is a plan view of one end of the distributor, Figure 4 is a vertical longitudinal sectional view taken through one end of the distributor on the plane indicated by the line 4—4 of Figure 2, Figure 5 is a transverse vertical sectional view taken through the distributor and disclosing the trough in a tilted position.

Referring more particularly to the drawings the numeral 1 designates my improved liquid distributor in its entirety. The distributor consists broadly of a supporting base A and an oscillatory trough structure B, the trough structure being mounted on the base for oscillation through a limited arc of travel for the purpose of discharging liquids at regulated intervals first to one side of the base and then the other.

The base in this instance consists of a pair of spaced longitudinally extending channel members 2—2 of structural metal, and supported upon the upper surfaces of the channel members, contiguous to the opposite ends thereof, are attached bearing blocks 3—3. These blocks bridge the channel members transversely and are provided with depending webs 4, which engage with the inner side of the channel members to hold the blocks against transverse displacement with respect to the channel members.

Each of the blocks 3 is formed to include an upstanding V bearing 5, in which is situated a knife edge stud 6 which projects integrally from an adjustable base plate 7 carried at each end of the trough structure B.

The trough structure itself consists of cast metal end walls 8—8, which are formed to include inwardly projecting bottom flanges 9, to which are riveted or otherwise secured the sheet metal bottom wall 10—10 of the trough. These walls extend throughout the length of the trough and have their end portions riveted to the flanges 9 as shown in Figures 3 and 5. The walls 10 have their inner portions bent upwardly to lie side by side in order to produce a divisional wall 11, which extends throughout the length of the trough and serves to divide the latter into spaced liquid receiving compartments 12—12, the latter extending longitudinally throughout the trough and are disposed on each side of the wall 11. In addition to the walls 10 and 11 the compartments 12 are further defined by means of longitudinally extending outer walls 13, which have their ends secured to the walls 8 and are slightly spaced from the downwardly extending flanges 14 provided at the outer edges of the walls 10 in order to provide longitudinally extending discharge slots or openings 15 through which liquid may flow from the compartments 12. Arranged immediately over the trough structure is a liquid supply pipe 16, which leads from any suitable source of liquid supply and is mounted independently of the distributor. The position of the discharge end of the supply pipe 16 is such as to be arranged exactly over the longitudinal axis of turning movement of the distributor so that when the latter is operatively positioned as shown in Figure 5, liquid will be discharged into one of the compartments 12 until the latter is filled with liquid to a desired extent and until the weight thereof is greater than the weight of the other side of the trough. This causes the trough to oscillate about the axis of its studs 6, swinging the trough bodily to its other extreme position to discharge the liquid from the filled compartment and at the same time to present the empty compartment to the supply pipe.

The end walls 8 are united by means of a longitudinally extending tie rod 17 which extends through the center of the trough structure below the walls 10. The ends of the tie rod 17 are received within bearings 18 formed in connection with the lower ends of the walls 8, and the tie rod serves to strengthen the construction of the trough and to enable the latter to withstand successfully the stresses and strains to which it is placed in practice.

Projecting horizontally from the end walls 8 are vertically aligned threaded studs 19, which are also positioned within vertical slots 20 provided in the face plate 7. By tightening the studs 19 the trough structure is rigidly secured in various positions of vertical adjustment in connection with said plate 7, and in this manner the height of the trough structure with respect to the stud 6 may be readily varied. To further control the extent of oscillation of the trough structure the plates 7 are formed to include outstanding ears 21 provided with threaded openings for the reception of adjustable set screws 22. These screws are positioned so as to strike the bearing blocks 3 when the trough is tilted, and it will be apparent that by adjusting the screws 22 the degree of tilt of the trough structure in discharging liquid may be varied as desired. The plates 7 are provided with depending fingers 23, which are receivable within slots 24 formed in the blocks 3. This construction serves to tie the blocks 3 to the trough structure and to prevent relative movement between these parts. The weight of the trough structure serves to prevent longitudinal movement thereof with respect to the base A.

Another feature of the invention resides in providing means for controlling the rapidity of tilting movement of the trough structure. This is attained by the provision of cylinders 25, arranged at the ends of the trough structure. These cylinders are arranged in pairs at each end of the trough structure and have their upper ends pivoted as at 26 to the plate 7. The cylinders are provided with pistons 27, which are connected by means of rods 28 with bracket ears 29 carried in connection with the blocks 3, the lower ends of the rods 28 being pivotally connected as at 30 to said ears. By this construction pneumatic means are provided for cushioning the rocking or tilting action of the trough structure, enabling the latter to operate at a controlled uniform rate of speed and preventing undue spilling of the liquid from the trough.

In operation, assuming that the trough occupies the working position disclosed in Figure 5, liquid obtained from any suitable source, such as industrial waste or the like, issues from the supply pipe 16 and is discharged into the compartment shown on the right of Figure 5. This compartment gradually fills with liquid until a preponderance of weight has been established therein which offsets the weight on the opposite side of the trough. When this occurs the trough oscillates in response to such weight until it reaches its other extreme position of movement. This is controlled by the adjustment of the set screws 22. The liquid in the filled compartment is then permitted to flow out of the trough structure by way of the slot 15. Since these slots are relatively narrow and restricted the flow of liquid from the trough structure is retarded to a sufficient extent to secure the desired discharge of liquid in properly regulated volume. It will be observed, however, that the slots 15 extend the entire length of the trough structure so as to secure the desired distribution of the liquid over an associated filtering bed (not shown). During the tilting movement of the trough structure the pistons and cylinders 27 and 25 respectively are used to absorb or arrest sharp, uncontrolled swinging action on the part of the trough structure and to so regulate the swinging movement as to provide for a gradual, cushioned turning movement which will prevent uncontrolled flow of the liquid from the trough structure. To obtain the proper positioning of the trough structure the latter is formed to a tilted position as shown in Figure 5. Thence, a spirit level or the like (not shown) may be placed upon the upper edge of one of the end walls 8, and by adjusting the set screws 22 this edge can be brought into a true horizontal plane. When this adjustment has been secured the set screws are locked and the structure is in position for proper operation. It will be seen that I have provided a trough of substantial and practical design, one which is easy to adjust and control and after adjustment is automatic in operation. Further, due to the metallic form of the trough long life thereof is secured with but a minimum of repair and attention. Due to the knife edge support for the ends of the trough the latter is permited to oscillate without undue friction. This renders the operation of the trough positive and prevents overflowing of the compartments thereof.

What is claimed is:

1. A liquid distributor of the character set forth comprising a base, an oscillatory trough pivotally mounted on said base, said trough being divided centrally and longitudinally into a plurality of liquid receiving compartments, and means permitting of the adjustment of said trough vertically with respect to its pivotal connection with said base.

2. A liquid distributor of the type set forth comprising a base, a trough structure including end walls, trunnion plates adjustably secured to said end walls permitting of the raising and lowering of said trough structure, and trunnions projecting from said plates and engaged with the cross members of said base to effect the oscillatory support of said trough structure.

3. In a liquid distributor, a base comprising longitudinally extending transversely spaced members, transversely extending bearing blocks, trough structure extending longitudinally with respect to said base, pivotal connections between said trough structure and said bearing blocks, said bearing blocks being formed with a transversely extending slot and a depending finger carried by said trough structure and received within said transverse slot, said finger and slot serving to hold the trough and bearing blocks in proper alignment with respect to each other.

4. In a liquid distributor, a base, bearing blocks carried by said base, a trough structure including end walls, trunnion plates secured to said end walls for the vertical adjustment of said trough with respect to said plates, trunnions projecting from said plates and engaging with the bearing blocks of said base to effect the oscillatory support of said trough structure.

5. In a liquid distributor, a base, bearing blocks carried by said base, a trough structure including end walls, trunnion plates carried by said end walls, trunnions projecting from said plates and engaging with the bearing blocks of said base, a pneumatic check device arranged on each side of the longitudinal center of said trough structure and having one of their ends pivotally connected with the upper ends of one of said plates and the lower end thereof pivotally connected with one of said bearing blocks, and an adjustable connection between the trunnion plates and said end walls permitting of the vertical adjustment of said trough structure with respect to its pivotal mounting without interfering with the operation or position of said check devices.

6. In a liquid distributor, a base, bearing blocks carried by said base, a trough structure including end walls, trunnion plates carried by said end walls, trunnions projecting from said plates and engaging with the bearing blocks of said base, adjustable stop devices carried by said plates for controlling the extent of oscillation of said trough, pneumatic cushioning means arranged on each side of the longitudinal center of said trough structure and having one of their ends pivotally connected with the upper end of one of said plates and the lower end thereof pivotally connected with one of said bearing blocks, and an adjustable connection between the trunnion plates and said end walls permitting of the vertical adjustment of said trough structure with respect to its pivotal mounting without interfering with the operation or position of said cushioning means and stop devices.

7. A liquid distributor of the character set forth comprising a base, said base being provided with spaced bearing brackets, a metallic trough member divided longitudinally by an internal wall into a plurality of liquid receiving compartments, end walls for said trough, trunnion plates carried by said end walls, trunnions projecting from said plates and engaging said bearing brackets, a pair of air check devices arranged at one end of said trough member and disposed one on each side of the longitudinal axis thereof, said check devices comprising cylinders having their upper closed ends pivotally connected with the upper ends of one of said trunnion plates, and pistons for said cylinders pivotally connected with the outer ends of said bearing brackets.

8. A liquid distributor of the character set forth comprising a base, said base being provided with spaced bearing brackets, a metallic trough member divided longitudinally by an internal wall into a plurality of liquid receiving compartments, trunnion plates carried by the end walls of said trough members, trunnions projecting from said plates and engaging the bearing brackets, a pair of air check devices of the cylinder and piston operating type arranged at one end of said trough member and disposed one on each side of the longitudinal axis of said trough member, said devices having one of their ends pivotally connected with the upper ends of one of said trunnion plates and the lower ends thereof pivotally connected to the outer ends of said bearing brackets, and a downwardly depending finger formed with the trunnion plates and adapted to operate within a transverse slot formed therefrom in said bearing bracket, by means of said slot and finger the pivotal connections at each end of the check devices are held in an operating alignment with respect to each other.

In testimony whereof I affix my signature.

ROBERT D. SIMPSON.